United States Patent [19]
Lamiaux

[11] Patent Number: 4,827,398
[45] Date of Patent: May 2, 1989

[54] PROCESS FOR INTERCONNECTING MICROPROCESSORS

[75] Inventor: Sylves Lamiaux, Ancreteville, France

[73] Assignee: Societe d'Applications Generales d'Electricite et de Mecanique Sagem, Paris, France

[21] Appl. No.: 754,728

[22] Filed: Jul. 15, 1985

[30] Foreign Application Priority Data

Jul. 17, 1984 [FR] France ............................. 84 11285

[51] Int. Cl.$^4$ ...................... G06F 13/14; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,699,529 | 10/1972 | Beyers et al. | 364/200 |
| 4,035,777 | 7/1977 | Moreton | 364/200 |
| 4,219,873 | 8/1980 | Kober et al. | 364/200 |
| 4,365,294 | 12/1982 | Stokken | 364/200 |
| 4,368,512 | 1/1983 | Kyu et al. | 364/200 |
| 4,396,978 | 8/1983 | Hammer et al. | 364/200 |
| 4,449,202 | 5/1984 | Knapp et al. | 364/900 |
| 4,456,956 | 6/1984 | El-Gohary et al. | 364/200 |
| 4,470,113 | 9/1984 | Oura | 364/200 |
| 4,484,273 | 11/1984 | Stiffler et al. | 364/200 |

FOREIGN PATENT DOCUMENTS

| | | |
|---|---|---|
| 2490435 | 3/1982 | France . |
| 2539821 | 4/1976 | Netherlands . |
| 3039306 | 5/1981 | Netherlands . |

OTHER PUBLICATIONS

IBM Technical Disclosure Bulletin, vol. 16, No. 10, Mar. 1974, pp. 3138 to 3139, New York, US; J. W. Vandenberg et al.: "Selective Receive Control for a Terminal".

Electronique & Application Industrielles, No. 255, Jun. 1978, pp. 35–39, Paris, France; J. Cl. Mathon: "Unmicro-Ordinateur concu pour la Realisation de Systems Multiprocesseurs".

Primary Examiner—Gareth D. Shaw
Assistant Examiner—Christina M. Eakman
Attorney, Agent, or Firm—Stevens, Davis, Miller & Mosher

[57] ABSTRACT

In a process for interconnecting microprocessors, a master microprocessor (1) transmits a character. All the slave microprocessors receive it in a register (4). If processing is in progress in the slave (2) for which it is intended, the character is masked until the processing is finished. After the processing, the slave microprocessor (2) recognizes it, removes it from the register (4) and loads this latter with an echo intended for the master microprocessor (1), allowing it to transmit a new character.

9 Claims, 1 Drawing Sheet

PROCESS FOR INTERCONNECTING MICROPROCESSORS

FIELD OF THE INVENTION

The present invention relates to a process for interconnecting microprocessors connected to a series data bus, in which a master microprocessor transmits characters one by one over the bus for the attention of at least one slave microprocessor associated with a register adapted for receiving a character.

The present invention therefore relates to a process for interconnecting microprocessors one of which is a master microprocessor and the others slave microprocessors, the master microprocessor being able to be any one of the microprocessors at any given moment.

BACKGROUND OF THE INVENTION

The interconnection of microprocessors is a problem which occurs more especially in the use of teleprinters, which comprise several microprocessors. More particularly, the problem posed here is that of interconnecting a master microprocessor and slave microprocessors all connected to a bus over which information must flow from one to the other in series form and at a relatively slow rate.

Heretofore, such interconnection has been made in the following way.

Each information or character transmitted by a master microprocessor for the attention of a slave microprocessor generally comprises an address and the text of the information properly speaking.

Since each micorprocessor is associated with a deserialization and serialization register also connected to the bus, when a master transmits a character, all the registers of the slaves receive this character.

Since each microprocessor is also associated with a recognition interface, which is connected thereto as well as to its deserialization register, the interface, if it recognizes its address in the character received by the associated deserialization register, causes the character to be removed from the register and stored in a buffer register, i.e. a memory, shared between the interface and the microprocessor. If not, the character is rejected from the deserialization register.

If such has been the procedure up to now, it was so that the reception of a character in a slave microprocessor did not cause interruption of its processing then in progress intended to cause it to provide a proper function, such for example as the control of a printer, so that this slave recognized and so accepted and stored this character in its memory. In fact, to accept a character and store it requires in real time a relatively long period, of the order of 100 μs, and a microprocessor does not always have the time required at the moment when the character reaches it, precisley if processing is in progress which cannot be interrupted. With this process therefore, because of the recognition interface, no additional constraint was suffered in real time and the slave microprocessors were thus relieved of the reception of data.

However, the interfaces for recognizing or accepting characters are expensive.

According to another solution, a master microprocessor could be adapted so as to transmit again a character, after receiving one, only after a given period of time, sufficient for a slave microprocessor to be able to finish the processing it has in progress before storing the character. This solution is however not very practical, for the predetermined time in question must be longer than the longest of the processing times which may not be interrupted for the whole of the slave microprocessors.

SUMMARY OF THE INVENTION

The present invention aims then at eliminating these recognition interfaces.

For this, the present invention provides a process for interconnecting microprocesors connected to a series data bus, in which a master microprocessor transmits characters one by one over the bus for the attention of at least one slave microprocessor associated with a register adapted for receiving a character, which process is characterized by the fact that a character received in the register of the slave microprocessor is only recognized and removed from the register at the end of the processing which is taking place there at the time of reception of the character, that it is the slave microprocessor which recognizes it and removes it from the register, that the bus remains empty until the character is recognized and removed from the register and that, after recognizing and removing the character from the register, the slave microprocessor transmits an echo signal or character over the bus allowing the master microprocessor to again transmit a character.

With the process of the invention, which thus eliminates any need for recognition interfaces, the slave microprocessor or microprocessors may continue their processing in progress after reception of a character in their register. Furthermore, it is no longer after a predetermined time that the master microprocessor transmits a new character but only as soon as it is invited to do so by the reception of the echo transmitted by the slave concerned by the character considered. All the microprocessors are thus synchronized, in that the master microprocessor cannot again transmit a character as long as it does not receive the echo of the preceding one. iI will be noted here that this echo is advantageously the same character as the incident character.

The invention is remarkable in that, although it aims at eliminating the recognition interfaces of the known process which, themselves, aimed at preventing the microprocessors from having to themselves recognize the incident characters so as to be able to continue their processing in progress, it proceeds nevertheless by recognition of the characters by the microprocessors. But although it is the microprocessors which recognize the incident characters, they only do so after finishing the processing in progress.

BRIEF DESCRIPTION OF THE DRAWINGS

The invention will be better understood from the following description of the preferred embodiment of the invention with reference to the accompanying drawings in which.

DETAILED DESCRIPTION OF THE INVENTION

Figure 1:
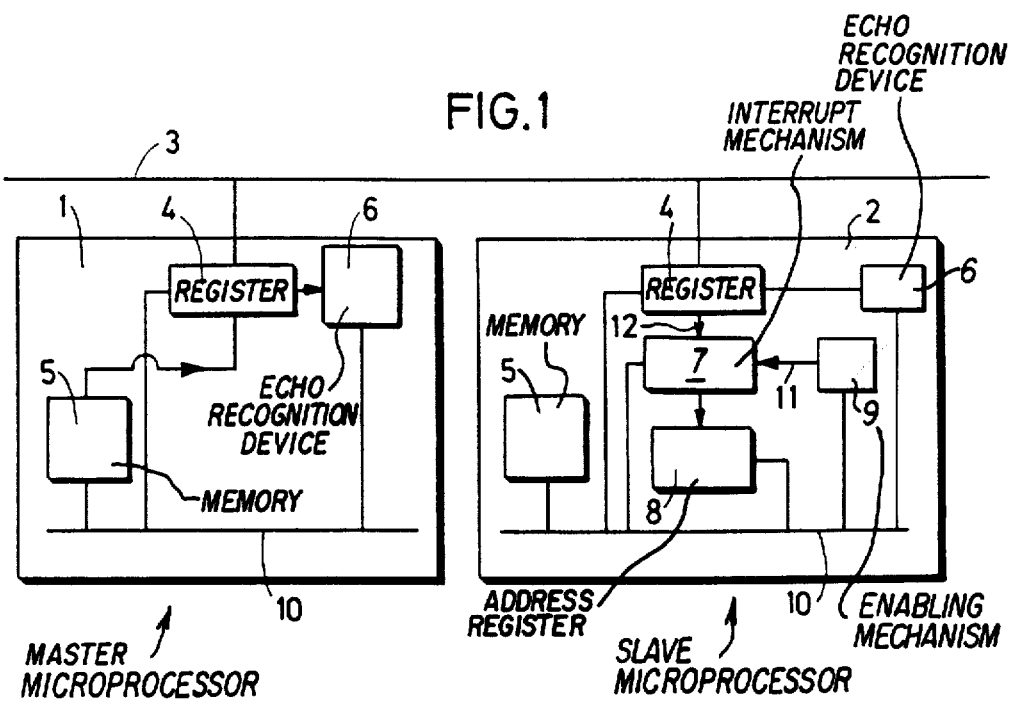
FIG. 1 shows schematically a master microprocessor and a slave microprocessor connected in accordance with the invention.
Figure 2:
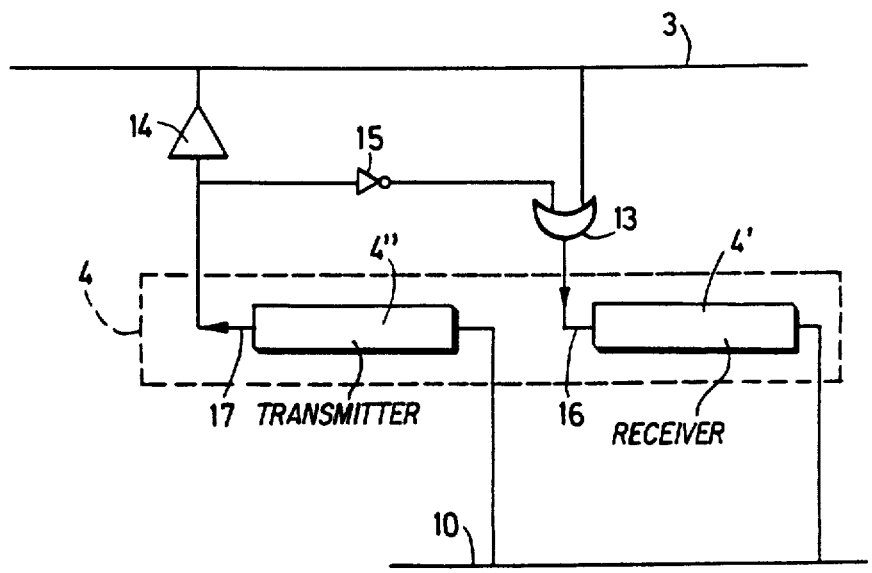
FIG. 2 shows schematically the asynchronous receiver-transmitter of the microprocessors and its connection elements to the series bus.

The following description concerns the process for interconnecting a master microprocessor and a slave microprocessor. But it will of course be readily understood that the invention applies to the interconnection of an unlimited number of microprocessors, any one of which may at any moment be the master microprocessor. The result is that all the microprocessors have at least all the equipment which will also be described, whether they are in connection with only the described master microprocessor or in connection with only the slave microprocessor.

Let us suppose then a first microprocessor 1, master at the time considered and a second microprocessor 2, slave at this same time. They are interconnected by a series bus 3, to which they are connected. Each of the microprocessors comprises an asynchronous receiver-transmitter 4, the deserialization register discussed above, connected to bus 3. Register 4 is of course used also as serialization register for, conversely, transforming into series form a character in parallel form.

The microprocessors further comprise a memory 5, an echo recognition device 6, an interrupt mechanism 7, an address register 8, an enabling mechanism 9, all these elements being connected to an internal data bus 10.

Register 4 is connected to memory 5 and to the echo recognition device 6 by bus 10, but for ease of understanding these functional connections have been shown in FIG. 1. Similarly, the interrupt mechanism 7 is connected to register 4, to the address register 8 and to the enabling mechanism 9 by bus 10, but these connections have also been shown in FIG. 1.

The interrupt mechanism 7 is in reality a part of the sequencer of the microprocessors providing the function of an AND gate. As for the enabling mechanism it is a flip-flop.

Let us now turn to the interconnection process.

When register 4 of the master microprocessor 1 transmits in series form over bus 3 a character taken from its memory 5, this character is received in register 4 of the slave microprocessor 2 as well as moreover, in all the registers 4 of all the other slave microprocessors (not shown). Let us suppose that it is indeed microprocessor 2 for which this character is intended and that processing is taking place there at the time of reception of this character.

When the interruption mechanism 7 is initialized, any processing in progress is interrupted for processing the character received in register 4. The initialization for enabling signal is received on line 11 connecting mechanism 7 to mechanism 9 and it is combined, at the input of mechanism 7, with the "register 4 full" signal, received over line 12 connecting mechanism 7 to register 4.

Since it is functionally an AND gate, mechanism 7, when the two signals are present at its inputs 11 and 12, empties register 8 of the address then present for substituting a new one which will cause reading of register 4 and reception of the character contained therein in memory 5, through bus 10.

According to the invention, the enabling signal is transmitted at the end of the processing in progress at the time of reception of the character. Until that time, the character received in register 4 was masked by interrupt mechanism 7

Then, the above described procedure takes place and register 4 unloads an echo character for transmission purposes in series form over bus 3 and for reception in parallel form in register 4 of the master microprocessor 1, before being recognized in the recognition device 6.

Between reception in register 4 of the slave microprocessor 2 of the character transmitted by the master microprocessor 1 and recognition by device 6 of the master microprocessor 1 of the echo transmitted by the slave microprocessor 2, bus 3 remained empty.

In order to avoid, although this is not imperative, the echo provided by register 4 from being taken for an incident character, i.e., so that the incident characters and the echoes are discriminated, this register has special features.

The asynchronous transmitter-receiver 4 comprises a receiver part 4' and a transmitter part 4", connected to the series bus 3 by an OR gate 13 and a line interface 14, respectively. The output of gate 13 is connected to input 16 of receiver 4', with one of its inputs being connected to bus 3 and its other input being connected to the input of interface 14 by an inverter 15. The input of interface 14 is also connected to the output 17 of transmitter 4".

Let us suppose that, when there is no echo transmitted, the output 17 of transmitter 4" remains at level 1. In this case, the level of the input 16 of receiver 4' must be the same as that of bus 3. When there is transmission of the echo loaded into transmitter 3", the level of bus 3 must be the same as that of the output of the transmitter 4" and the input 16 of receiver 4', which must receive nothing, must remain at level 1.

That results, for the input 16 of receiver 4', in the following truth table of:

| Transmitter | Bus | |
|---|---|---|
| | 0 | 1 |
| 0 | 1 | |
| 1 | 0 | 1 |

This is why the OR gate 13 and the inverter 15 have been provided.

I claim:

1. A process for interconnecting microprocessors connected in series to a series data bus, said process comprising:
    employing a master microprocessor to transmit characters one-by-one over said bus for the attention of at least one slave microprocessor associated with a register adapted to receive one of said characters,
    employing said slave microprocessor to recognize and remove a character received in said register of said slave microprocessor at the end of processing which is occurring therein at the time of reception of said character,
    causing said bus to remain empty from a time after said character has been transmitted by said master microprocessor over said bus until said slave microprocessor recognizes and removes said character from said register, and
    employing said slave microprocessor to transmit an echo signal to said master microprocessor over said bus after said slave microprocessor recognizes and removes said character from said register to enable said master microprocessor to transmit another character, wherein the character received in the register of the slave microprocessor is masked by an interrupt circuit until the end of the processing in progress.

2. Process according to claim 1, characterized by the fact that each of the microprocessors comprises means for functioning as a master microprocessor.

3. Process according to claim 1, characterized by the fact that the register is emptied of its contents at the end of the processing in progress.

4. Process according to claim 3, characterized by the fact that after having been emptied of said character, the register is loaded with an echo.

5. Process according to claim 4, characterized by the fact that an incident character and an echo are discriminated in the register.

6. A process for interconnecting microprocessors connected in series to a series data bus, said process comprising:

employing a master microprocessor to transmit characters one-by-one over said bus for the attention of at least one slave microprocessor associated with a register adapted to receive one of said characters, employing said slave microprocessor to recognize and remove a character received in said register of said slave microprocessor at the end of processing which is occurring therein at the time of reception of said character, causing said bus to remain empty from a time after said character has been transmitted by said master microprocessor over said bus until said slave microprocessor recognizes and removes said character from said register, and employing said slave microprocessor to transmit an echo signal to said master microprocessor over said bus after said slave microprocessor recognizes and removes said character from said register to enable said master microprocessor to transmit another character, wherein after recognizing and removing said character, said slave microprocessor moves said character to a memory associated with said slave microprocessor.

7. A system of interconnected microprocessors connected to a series data bus, comprising:
(a) a master microprocessor, and
(b) at least one slave microprocessor including an internal data bus connected to (i) a character receiving register, (ii) an interrupt mechanism for masking a character received in said character receiving register, (iii) a memory, (iv) an echo recognition device, (v) an address register and (vi) an enabling mechanism, the interrupt mechanism having one input connected to an output of the character receiving register and an output connected to an input of the address register and the enabling mechanism having an output connected to another input of the interrupt mechanism, the character receiving register comprising a receiving part and a transmitting part respectively connected to the series data bus by an OR gate and a line interface circuit, said line interface circuit having an output connected to said series data bus, the OR gate being connected to the input of said receiving part, said OR gate having one of its inputs connected to said series data bus and its other input connected to an input of said line interface circuit by an inverter, said input of the line interface circuit being connected also to an output of said transmitting part of the receiver.

8. A system as in claim 7, wherein a plurality of slave microprocessors are interconnected to the master microprocessor.

9. A system as in claim 8, wherein each of the microprocessors comprises means for functioning as said master microprocessor.

* * * * *